No. 12,133. REISSUED JULY 21, 1903.
C. PFANSCHMIDT & J. SIEFERT.
MASSAGE MACHINE.
APPLICATION FILED MAY 7, 1903.
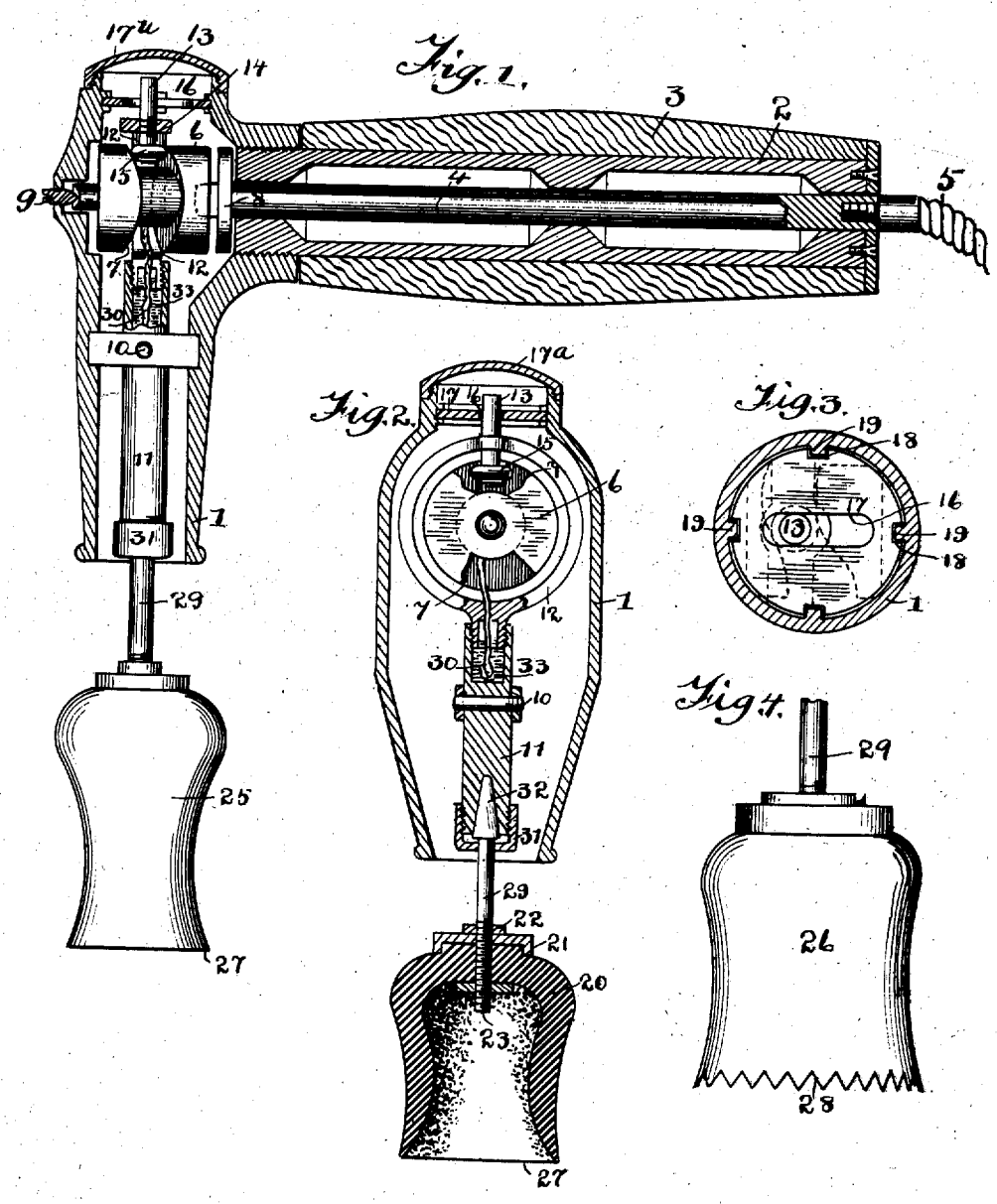
Witnesses
Samuel W. Banning,
Oscar W. Bond
Inventors
Charles Pfanschmidt
John Siefert.
By Banning & Banning.
Att'ys.

No. 12,133. Reissued July 21, 1903.

UNITED STATES PATENT OFFICE.

CHARLES PFANSCHMIDT AND JOHN SIEFERT, OF CHICAGO, ILLINOIS.

MASSAGE-MACHINE.

SPECIFICATION forming part of Reissued Letters Patent No. 12,133, dated July 21, 1903.

Original No. 702,820, dated June 17, 1902. Application for reissue filed May 7, 1903. Serial No. 156,002.

*To all whom it may concern:*

Be it known that we, CHARLES PFANSCHMIDT and JOHN SIEFERT, citizens of the United States, and residents of Chicago, in the county of Cook and State of Illinois, have invented a new and Improved Massage-Machine, of which the following is a full, clear, and exact description.

Our invention relates to a massage-machine for the use of barbers, physicians, nurses, and others suitable for general use and also for special use upon the face and scalp.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a longitudinal section of our device, showing certain details in elevation; Fig. 2, a section showing the principal parts of the operating mechanism. Fig. 3 is a fragmentary plan view with the cap removed, and Fig. 4 is a detail view of one form of massage-cup.

An L-shaped frame is provided, consisting of members 1 and 2, secured rigidly together. A handle 3 is loosely mounted upon the cylindrical member 2. A revoluble shaft 4 is mounted in this cylindrical member and is detachably secured to the end of a flexible shaft 5. A cam 6, provided with a spiral groove 7, is secured upon the shaft 4 by means of an adjustable nut 8 and is supported at one end by an adjustable screw 9, which is in alinement with the axis of the shaft.

Upon a pivot 10 is mounted a lever 11, so that the lever is free to rock. The upper end of the lever is provided with a yoke 12, in which is adjustably mounted a boss 13, which engages the yoke by means of screw-threads 14 on the boss. The upper end of the boss 13 is normally free to travel in a slot 16 in a plate 17, which is detachably held in position by means of studs 19 on the member 1 of the frame and which engage recesses 18 in the plate. A revoluble roller 15 is mounted upon the lower end of the boss 13 for the purpose of engaging the spiral groove 7 in the cam 6. A cap 17[a] protects the working parts from dust. The revolution of the shaft 4 causes the rotation of the cam 6, and thereby rocks the lever 11. By adjusting the boss 13 relatively to the yoke 12 the roller 15 is made to approach or recede from the axis of the cam, and thereby acts to shorten or lengthen the stroke of the lever 11.

Upon the lower end of the lever 11 massage-cups 20, 25, and 26 of various forms may be secured. These cups may be provided with plain edges 27 or with serrated edges 28, as desired. The cups are mounted upon a stem 29, provided with a conical upper end 32 and with a threaded cap 31, which engages the lever 11. A flanged cap 21 and a nut 23 are placed opposite each other upon the respective inside and outside portions of the cup, and a collar 22 bears upon the cap 21, as shown more particularly in Fig. 2.

The upper end of the lever 11 is provided with a receptacle 33 for the purpose of holding oil or any suitable lubricant. An absorbent member or wick 30 normally depends into the oil and projects upward, so as to make a contact with the groove 7 of the cam 6. The object of this arrangement is to keep the groove of the cam properly lubricated and in doing this to utilize the motion of the lever 11. It will be understood that when the lever 11 rocks the shaking of the receptacle causes the oil to permeate the wick more readily.

The mode of using our invention is quite simple. The operative merely grasps the handle 3, starts up the power actuating the flexible shaft 5, and passes the massage-cup over the face or scalp of the patient. The massage-cup swings in an arc substantially parallel to the general direction of the handle.

We have found that the machine in operation runs smoothly and safely without any appreciable jar and that its effect upon the person operated upon is very agreeable.

Having thus described our invention, we claim as new and desire to secure by Letters Patent—

1. In a massage-machine, the combination of a frame adapted to be grasped by the hand, a massage-cup shaped substantially as shown, a vibratable lever carried by the frame and having the massage-cup secured thereto, and means for operating the vibratable lever, the body of the cup having the edge adapted to swing in an arc as the vibratable lever is operated, substantially as described.

2. In a massage-machine, a massage-cup shaped substantially as shown, its open end having an edge furnishing an operating-surface, a vibratable lever carrying the massage-cup, and means for actuating the vibratable lever and causing the cup to swing in the arc of a circle and impart a vibratory motion to its edge, substantially as described.

3. A massage-machine comprising a carrying-frame, a massage-cup shaped substantially as shown provided with an edge, a lever having the cup-shaped massage member attached thereto, and mechanism carried by the frame and engaging the lever for imparting a vibratory movement to the lever to be transmitted to the body of the massage member and the acting edge of the massage member, substantially as described.

4. A massage-machine, comprising a frame, a massage member, a longitudinal handle mounted upon said frame, and mechanism connected with said frame and said massage member, and free to actuate said member in a direction substantially parallel to the general direction of said handle.

5. A massage-machine, comprising a frame provided with a longitudinal member, a handle loosely connected with said frame and disposed at right angles to said member, a revoluble member extending through said handle and provided with a cam, the axis of said cam being at right angles to the general direction of said longitudinal member and parallel with said handle, a rocking lever pivotally mounted in said longitudinal member and provided with a member engaging said cam, and means for securing a massage member to said lever.

6. A massage-machine, comprising a frame, a revoluble member mounted thereon and provided with a spiral cam, a lever provided with a yoke embracing said cam, a boss mounted upon said yoke and engaging said cam, means for securing a massage member to said lever, and means for actuating said revoluble member.

7. A massage-machine, comprising a hollow frame, a rocking lever journaled within the same and provided with a receptacle for the purpose of holding a lubricant, a cam for actuating said lever, and an absorbent member engaging said receptacle and said cam for the purpose of lubricating said cam, means for securing a massage member to said lever, and mechanism for actuating said cam.

8. A massage-machine, comprising a hollow frame having two longitudinal members forming an angle with each other, a longitudinal handle mounted upon one of said members, a longitudinal rocking lever journaled in the other member and normally disposed in a general direction parallel therewith, said lever being free to rock in a plane parallel with the axis of said handle, fastenings for securing a massage member to said lever, and means for actuating said lever, the arrangement being such that said massage member is free to move in a direction substantially parallel with the general direction of said handle.

9. A massage-machine, comprising a hollow frame, a cam mounted thereon, means for actuating said cam, a rocking member provided with a boss for engaging said cam, means for adjusting said boss relatively to said cam for the purpose of regulating the stroke of said rocking member, and means for securing a massage member to said lever.

10. A massage-machine, comprising a hollow frame, a cam revolubly mounted thereon, means for actuating said cam, a rocking member provided with a boss for engaging said cam, a guide for preventing said rocking member from moving in a direction other than its normal direction of rocking movement, and means for securing a massage member to said rocking member.

11. A massage-machine, comprising a frame consisting essentially of a longitudinal member and a handle disposed in right-angle relation to the longitudinal member, a revoluble member extending through said handle, a rocking lever pivotally mounted in the longitudinal member and having its vibratable movement imparted thereto from the revoluble member, and a massage-cup formed substantially as shown connected with the lever and adapted to swing in the arc of a circle and have the vibratable motion of the rocking lever imparted to its edge, substantially as specified.

In testimony whereof we have signed our names to this specification in the presence of two subscribing witnesses.

CHARLES PFANSCHMIDT.
JOHN SIEFERT.

Witnesses:
THOMAS A. BANNING,
WALKER BANNING.